United States Patent [19]
Mason, III

[11] Patent Number: 5,379,558
[45] Date of Patent: Jan. 10, 1995

[54] GROUND COVERING MAT FOR GROUND ANCHORED STRUCTURE

[75] Inventor: Russell E. Mason, III, Fayetteville, N.C.

[73] Assignee: R. E. Mason Enterprises, Fayetteville, N.C.

[21] Appl. No.: 81,605

[22] Filed: Jun. 23, 1993

[51] Int. Cl.6 .............................................. E04H 3/08
[52] U.S. Cl. ...................... 52/105; 52/155; 52/169.14; 52/742; 47/9; 47/25; 47/32
[58] Field of Search ................. 52/105, 516, 517, 3–5, 52/169.14, 155, 742; 47/9 S, 25 R, 32

[56] References Cited

U.S. PATENT DOCUMENTS

| | | | |
|---|---|---|---|
| 975,802 | 11/1910 | Shedd | 52/4 |
| 1,046,418 | 12/1912 | Moses . | |
| 1,166,811 | 1/1916 | Bowers . | |
| 1,846,274 | 2/1932 | Otwell | 47/9 S |
| 2,401,997 | 6/1946 | Whitman | 47/9 S |
| 4,910,078 | 3/1990 | Hill et al. | 428/290 |
| 5,059,463 | 10/1991 | Peters | 428/65 |
| 5,158,258 | 10/1992 | McFadzean | 52/4 |

FOREIGN PATENT DOCUMENTS

| | | | |
|---|---|---|---|
| 2652602 | 4/1991 | France | 52/517 |
| 3504112 | 8/1986 | Germany | 47/25 R |

Primary Examiner—James L. Ridgill, Jr.
Attorney, Agent, or Firm—Rhodes, Coats & Bennett

[57] ABSTRACT

A ground covering mat creating a safe working environment around certain pedestals containing electrical and/or telephone equipment and for preventing the growth of vegetation around ground-anchored structures in general. Such structures include fire hydrants, pedestals for containing telephone or electrical circuitry, and gas vents. The mat includes a main body defined by an outer perimeter. The mat is constructed from synthetic fibers saturated with a resin containing ultraviolet inhibitors and a fire-retardant. The mat is resilient so as to conform to the shape of the ground for which it covers. The mat is designed to be substantially non-biodegradable. In a preferred embodiment, the mat has a concentric series of scored profiles defining successively larger interior sections. The scored profiles facilitate a user in cutting a central open area corresponding in with the size of the ground anchored structure. The mat further includes a plurality of stake openings around the periphery of the mat and adjacent to the outer edge. The mat is anchored to the ground around the ground-anchored structure by inserting stakes through the stake openings.

38 Claims, 2 Drawing Sheets

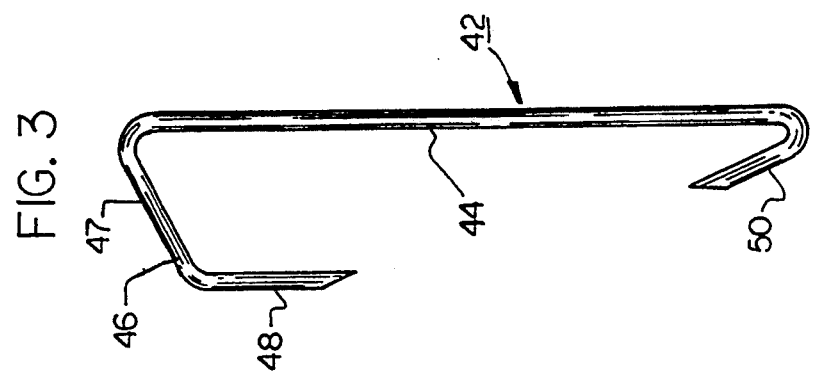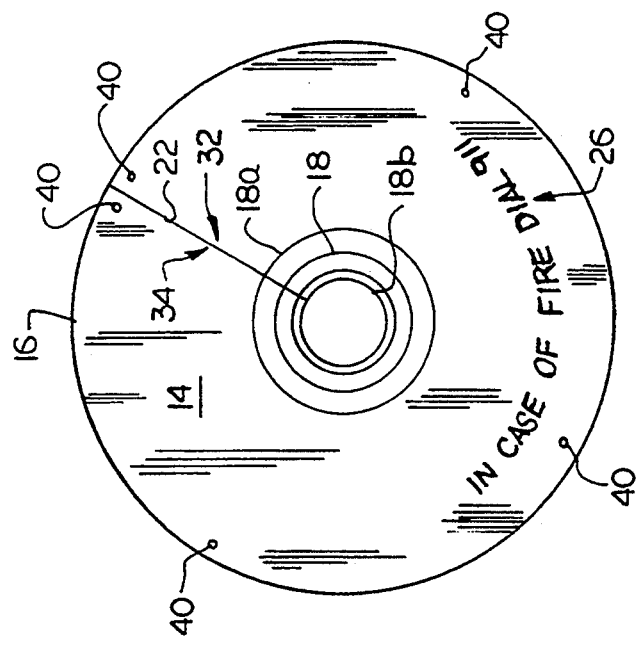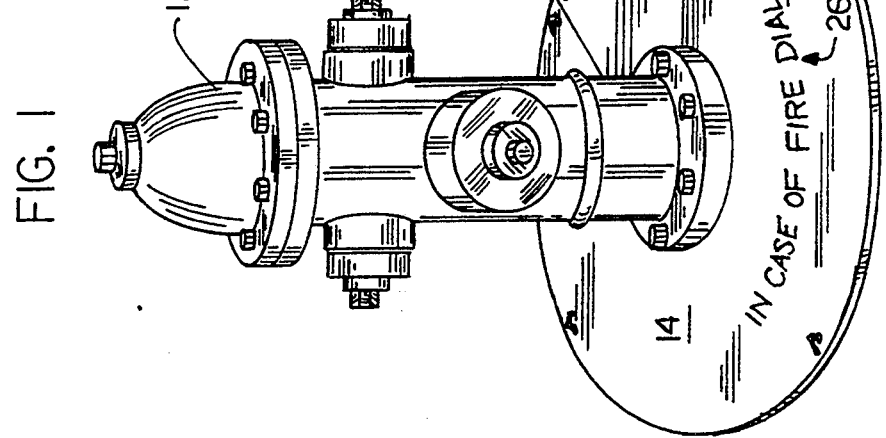

GROUND COVERING MAT FOR GROUND ANCHORED STRUCTURE

BACKGROUND OF THE INVENTION

The present invention relates generally to methods and devices for creating a safe working environment around certain pedestals containing electrical and/or telephone equipment and for preventing vegetation growth around ground anchored structures in general. More particularly, the invention is directed to methods and devices for covering ground area immediately surrounding a ground anchored structure to prevent the growth of vegetation and spread of insects therearound.

Fire hydrants, pedestals, and gas fence and other similar ground-anchored structures are often located in areas where vegetation grows around the base of the structure. Vegetation around the ground-anchored structures must routinely be maintained to prevent the overgrowth of vegetation. Such overgrowth of vegetation can have several adverse affects. Primarily, overgrowth of vegetation can reduce visibility of the ground-anchored structure. For ground-anchored structures, such as fire hydrants, gas units, and telephone pedestals, repeater sites and cross-boxes, high visibility is critical due to prevent damage by maintenance equipment and to quickly locate the structure in the case of a fire hydrant in emergencies. The lack of visibility of ground-anchored structures, which extend only a short distance above the ground, such as some gas vents, can also result in mowers inadvertently colliding with the ground-anchored structure and damaging the mower or structure.

Vegetation growth also increases the odds of insects, rodents and snakes inhabiting the area therearound, thus presenting a potential danger or nuisance to personnel accessing the ground-anchored structure. In certain areas of the country, fire ants are drawn to pedestals containing electrical equipment where they build nests. The soft earth around ground-anchored structures is also apparently attractive to these pests. Some structures such as telephone pedestals for pay phones, are placed beside the road. It is not attractive for patrons to stand in weeds or high grass when using utility services. In addition, vegetation around the ground-anchored structure can increase the amount of damage caused during a brush fire because the vegetation will maintain the fire for an increased period of time.

Due to the above problems associated with vegetation growth around ground-anchored structures, routine maintenance must be performed to control the growth thereabout. The routine maintenance typically entails periodic mowing and/or placing herbicides around the ground-anchored structure. There are several problems associated with these prior art methods for controlling vegetation around the ground-anchored structures.

Mowing around the ground-anchored structure to control vegetation growth results in substantial labor and other costs. Ground-anchored structures located in rural areas, in particular, require relatively frequent mowing to control the rapidly growing vegetation which tends to surround ground-anchored structures. The cost of frequently sending out mowing crews which must take additional time to mow around ground-anchored structures can result in substantial increases in labor costs. In addition, damage can be caused to the structures themselves or to mower and equipment which collides with the ground-anchored structures which may be partially concealed by vegetation growth. The cost of repairing or replacing mowers due to damaged caused by concealed ground-anchored structures can be substantial.

Problems are also encountered by the use of herbicides to control vegetation around the ground-anchored structures, The harmful chemicals may result in environmental damages and concern and potentially getting to the ground water. Herbicides are also corrosive and can cause damage to the ground-anchored structures.

An improved device and method for controlling the vegetation around the ground-anchored structure is needed.

SUMMARY OF THE INVENTION

The present invention is therefore intended to create a safe working environment around electrical and telephone pedestals in particular and to prevent growth of vegetation around ground-anchored structures in general. For purposes of this invention, these purposes will be collectively defined as "creating a clear area". In one preferred embodiment, a mat of U.V. resistant, fire-resistant material includes a series of concentric perforated circular or rectangular profiles formed in the main body thereof. The perforated profiles are used to aid the user in cutting an interior opening of selected size in the mat. The interior opening is cut to a size corresponding with the ground anchored structure to be encircled. Accordingly, the interior opening is fitted around the ground anchored structure such that the mat fits snugly adjacent the ground anchored structure and extends a fixed distance therefrom. Stake openings encircle the mat in a position adjacent the mat's outer border. Stakes extend through the stake openings to anchor the mat securely to the ground.

The mat is constructed from synthetic fibers that have been saturated with a resin containing ultraviolet inhibitors and a fire-retardant. Constructing the mat in this manner results in a mat that is air and water pervious to enhance drying, but substantially blocks the passage of sunlight therethrough and is substantially non-biodegradable and fire-retardant. Accordingly, the mat can be used for many years without replacement. The UV inhibitors retard decomposing and the fire-retardant protects the mat and the ground-anchored structure from brush fires. Indicia is inscribed on the top side of the mat to provide information corresponding with the particular ground support structure for which a mat is designed.

Additionally, it has been found that the presence of the mat inhibits erosion that may occur around newly erected ground-anchored structures, particularly those erected on banks.

In alternative embodiments, the mat may be provided without perforated profiles or even in which the interior openings have already been cut out. In practicing the method of the present invention, a sheet of fibers saturated with a resin as described above is cut to size and emplaced around a ground-anchored structure.

Accordingly, it is an object of the present invention to provide a ground covering mat for creating a clear area around a ground-anchored structure.

Another object of the present invention is to create a clear area by blocking the passage of sunlight therethrough to the vegetation therebeneath.

Another object of the present invention is to prevent vegetation growth around a ground anchored structure minimizing the need for routine maintenance.

Another object of the present invention is to create an environment around a ground-anchored structure that is unattractive to insects, rodents, and small animals such as snakes.

Another object of the present invention is to provide a ground covering mat designed to be used with various sized ground anchored structures.

Another object of the present invention is to provide a ground covering mat that is easily positionable around a ground anchored structure.

Another object of the present invention is to provide a long-lasting vegetation barrier around a ground anchored structure.

Another object of the present invention is to provide a durable, economical and easy-to-install ground covering mat for surrounding ground anchored structures.

Other objects and a fuller understanding of the invention will become apparent from reading the following detailed description of preferred embodiments, along with the accompanying drawings.

BRIEF DESCRIPTION OF THE DRAWINGS

FIG. 1 is a perspective view showing the first embodiment of the present invention is use around a fire hydrant.

FIG. 2 is a top plan view of the mat of the first preferred embodiment.

FIG. 3 is a side view of a stake used to anchor the mat.

DETAILED DESCRIPTION OF A PREFERRED EMBODIMENT

Figure 5:
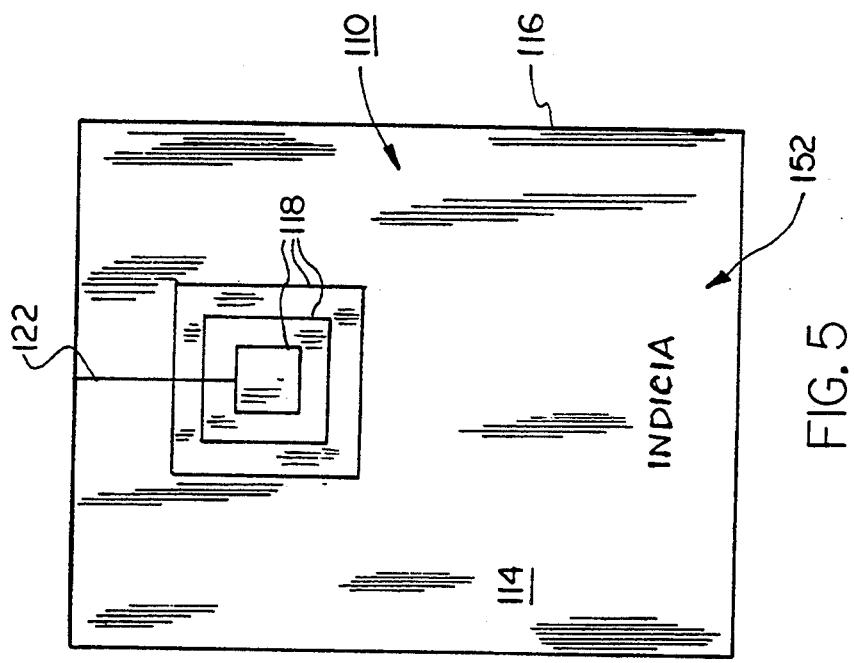
FIG. 5 is a top plan view of the mat of the second preferred embodiment.

Referring generally to the drawings, one preferred embodiment of the ground covering mat of the present invention is indicated generally by the numeral 10. Mat 10 is used in conjunction with ground anchored structures that extend upwardly from an outdoor ground surface. For example, ground anchored structure 12 includes such structures as fire hydrants, pedestals for containing telephone equipment and electrical circuitry, gas vents, utility poles, guy wires and the like. Mat 10 is designed to create a clear area around such structures. In general, mat 10 anchored structure 12 and extends therefrom to cover the ground immediately surrounding the area. Mat 10 is a vegetation barrier in that it blocks sunlight and thus prevents vegetation from growing around the ground support structure 12. The mat is also a deterrent to the presence of fire ants, insects, rodents, and other small animals and pests. Preferred embodiments of the present invention are described below.

Referring to FIGS. 1 and 2, a first preferred embodiment of mat 10 is shown. Mat 10 includes a body portion 20 having an outer perimeter or edge 16. A series of concentric scored or perforated profiles 18 are provided on body portion 20. Appropriate descriptive indicia 26 is inscribed on the upper surface of body portion 20 between outer edge 16 and the outermost scored profile 18a. Indicia 26 provides information corresponding with the ground anchored structure for which mat 10 is designed. For example, the inscribed indicia 26 of mat 10, as shown in FIG. 1, conveys to a viewer that the emergency phone number 911 should be called if there is a fire. Indicia 26 can be used to convey other types of information that may be important to users of the particular ground anchored structure surrounded by the ground covering mat. Accordingly, ground covering mat 10 provides a effective, customized display area for information corresponding to a particular ground anchored structure 12. Because mat 10 and the inscribed indicia 26 will be exposed to the outdoor environment, inscribed indicia 26 is formed from a ink having excellent inner coat adhesion and flexibility, fast jet drying, and excellent line definition. In the preferred embodiment, a fast dried gloss vinyl ink is used.

Mat 10 further includes a score line 22 which extends from the innermost perforated profile 18b to outer edge 16. Score lines 18b and 22 allow mat 10 to be more easily positioned about a ground anchored structure 12. In particular, score line 18b (and the other score lines) provide a guide for cutting an interior opening in main body portion 20. Once mat 10 has been positioned around ground anchored structure 12 (FIG. 1), first and second sides 32,34 are positioned adjacent one another such that mat 10 extends outwardly from the ground anchored structure in all directions and substantially covers the area surrounding the ground anchored structure 12.

Encircling main body 14 and positioned adjacent to outer border 16 are a plurality of stake openings 40. Stake openings 40 are used in conjunction with stakes 42 for anchoring mat 10 to the ground. A pair of the stake openings 40 are positioned adjacent perforated line 32 to ensure proper anchoring of the mat about perforated line 22.

Each stake includes a elongated member 44, a top hook 46 and a bottom barb 50, as shown in FIG. 3. Top hook 46 includes a horizontal spacer bar 47 and a downwardly extending free end 48 which forms a pointed fastener. The length of spacer bar 47 should be at least equal to or greater than the distance from openings 40 to edge 16 to provide for proper installation. The bottom barb 50 is implanted into the ground with the elongated member 44 extending adjacent outer edge 16 and the top hook 46 is positioned through a stake opening 40 to anchor mat 10 to ground.

Mat 10 is constructed of a very dense, multi-directional needled batting of synthetic fibers. Preferably, polyester synthetic fibers are used. The fibers are saturated in a resin formed from a vinyl chloride polymer that also contains ultraviolet inhibitors, a selected colorant, and a fire-retardant. When constructing mat 10, the saturated, synthetic fibers are pressed to less than half of their original thickness. Pressing the saturated, synthetic fibers helps improve the strength and durability of mat 10. Likewise, the resin which coats the synthetic fibers includes a commercially available UV inhibitor and fire retardant. So treated, the mat 10 will not support a flame, once the source of the flame is removed therefrom. The ultraviolet inhibitors located within the resin of mat 10 protects mat 10 from deterioration due to sunlight and exposure from the environment for many years of use.

The multi-directional needling of synthetic fibers results in a mat 10 that is porous so as to allow water and air to pass through the mat, while substantially preventing sunlight from passing therethrough. Passage of air and water will permit draining and drying to prevent rotting of the fibers. The porous construction of mat 10 also insures that the mat 10 is sufficiently lightweight for easy handling.

Figure 4:
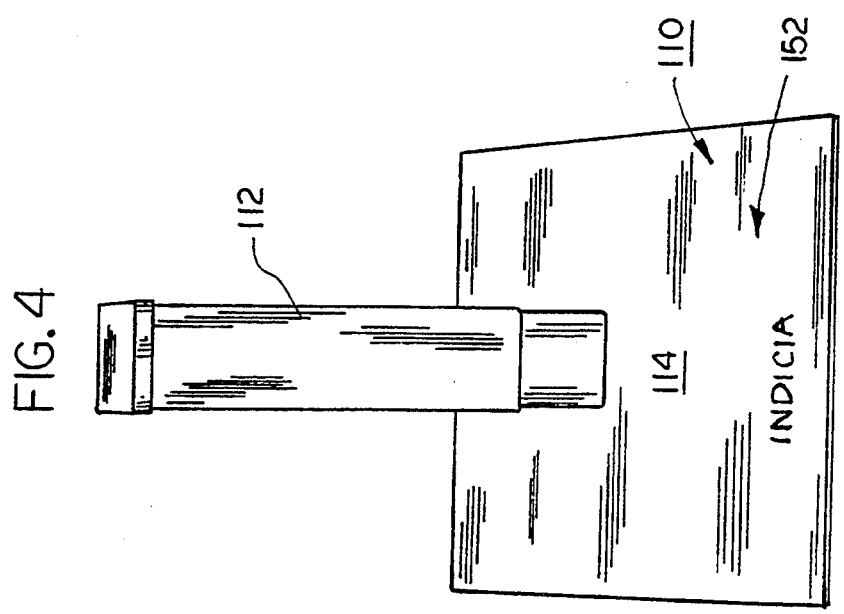
FIG. 4 is a perspective view of a second preferred embodiment of the mat showing the mat surrounding an electrical or telephone pedestal.

Referring to FIGS. 4 and 5, a second embodiment of the mat of the present invention is indicated generally by the numeral 110 for use with a telephone terminal box 112. Mat 110 is constructed in an identical manner as the first preferred embodiment with a few variations described below. Mat 110 includes a main body 114 having an outer edge 116. Rectangular perforated profiles 118 each enclose successively larger interior openings. Scored profiles 118 are offset from the center of mat 110. Again, a score line 122 extends from the innermost profile 118 to the edge 116.

An interior opening is formed in the mat 110 by cutting along a selected scored profile 118 corresponding in size and shape to the structure with which it is to be used. In use, the main body 114 of mat 110 surrounds and covers the area around the ground-anchored structure 112. Because the perforated profile 118 and interior opening thus formed is offset from the center of mat 110, a front extension section 152 is formed which extends outwardly a greater distance from the structure. Front extension section 152 extends outwardly a distance further than the other sides of mat 110. This provides an extra surface area to form a good work surface in the event that the ground anchored structure 112 is accessed for use or maintenance.

The mat 10 is used to create a clear area around a ground-anchored structure 12 as follows. A user measures the base of the ground-anchored structure 12 to be surrounded by mat 10. Based on the circumference of the base of ground-anchored structure 12, the user selects a perforated profile 18 having a circumference slightly larger than the base of the ground-anchored structure 12. This profile is cut with a sharp blade and the interior portion removed to form an interior opening in mat 10. The user can then cut along score line 22 such that first and second sides 32, 34 are separable from one another.

Once interior opening has been formed in mat 10 and score line 22 has been cut, mat 10 can be positioned about the ground-anchored structure 12. The cut in main body 14 along score line 22 allows the user to expand the diameter of interior opening as mat 10 is positioned over the ground-anchored structure 12. Once the mat 10 is positioned adjacent the ground, first and second sides 32, 34 are positioned adjacent one another such that the ground surrounding the ground anchored structure is fully covered. The diameter of the interior opening is sized so that the main body 14 is adjacently positioned along the outer surface of the base of the ground anchored structure 12 as shown in FIG. 1. Stakes 42 are then inserted into the ground and through stake opening 40 to anchor mat 10 to the ground. The flexible construction of mat 10 insures that the mat conforms to any irregularities in the ground that is covered.

Mat 10 prevents erosion in the area beneath the mat and allows water from rain to pass through its porous structure so that rain drains through the mat 10 or runs off the sides of mat 10 to prevent puddling on mat 10. Mat 10 also helps prevent the ground anchored structure from being damaged by brush fires. In particular, because vegetation is prevented from growing adjacent the ground anchored structure 12, ground anchored structure 12 is less likely to be exposed to flame.

The second embodiment of the present invention, as shown in FIGS. 4 and 5, is used in manner identical to the first embodiment. The only difference is that mat 110 covers a rectangular surface area surrounding a ground anchored structure and is designed with rectangular borders to correspond with a ground anchored structure having a rectangular section. In addition, mat 110 of the second preferred embodiment includes an extended front section 52 sized to allow a user to kneel on and work on the structure surrounded by the mat 110.

The present invention provides a durable and easy-to-use device in clearing the area around a ground-anchored structure 12, 112. Use of the present invention provides significant advantages by increasing the visibility and accessibility of ground-anchored structure 12.

As will be apparent, various modifications to the preferred embodiments described herein may be made and still fall within the scope of the claims.

I claim:

1. A ground-cover apparatus for clearing the area around a ground-anchored structure, comprising:
   a) a mat having a generally planar, flexible configuration including a main body portion defined by an outer perimeter;
   b) said mat being formed of a substantially fibrous material that is uniformly porous so as to block the passage of sunlight while being pervious to air and water, and is treated with an ultraviolet inhibitor and a flame retardant;
   c) a central area of the mat being removable to permit installation of said mat around said ground anchored structure;
   d) a pattern of scored concentric profiles located within the perimeter of said main body and indicative of said removable central area;
   e) whereby said mat, when installed, discourages the presence of animals in the immediate area, prevents the growth of vegetation around the structure, is substantially non-biodegradable, drains and dries.

2. The ground cover apparatus of claim 1 wherein the main body portion is pliable so as to conform to any ground surface on which it may be placed.

3. The ground cover apparatus of claim 1 and further including a plurality of stake openings in said mat adjacent said perimeter, wherein a stake is extendable through each stake opening so as to anchor the ground covering mat to the ground.

4. The ground cover apparatus of claim 1 further including a score line extending from one of the scored profiles outwardly to the outer perimeter so as to allow installation of the mat around the base of the ground-anchored structure.

5. The ground cover apparatus of claim 1 wherein said profiles are arranged, off center of the mat so as to form an enlarged access or work area.

6. The ground cover apparatus of claim 1 wherein the said body is circular.

7. The ground cover apparatus of claim 6 wherein the scored profiles are circular so as to form a central area corresponding with the ground-anchored structure.

8. The ground cover apparatus of claim 1 wherein the main body is rectangular.

9. The ground cover apparatus of claim 8 wherein the scored profiles are rectangular so as to form a rectangular central area corresponding with the ground-anchored structure.

10. The ground cover apparatus of claim 1 further including an inscribed indicia located on the upper surface of said main body portion.

11. The ground cover apparatus of claim 10 wherein said inscribed indicia is located between the outer perimeter and the outermost scored profile.

12. The ground cover apparatus of claim 10 wherein said inscribed indicia is formed from a fast dry gloss vinyl ink.

13. The ground cover apparatus of claim 1 wherein the main body is constructed with synthetic fibers.

14. The ground cover apparatus of claim 13 wherein the synthetic fibers are combined with a resin containing said ultraviolet inhibitor.

15. The ground cover apparatus of claim 14 wherein the synthetic fibers and combined resin is pressed to form the main body.

16. The ground cover apparatus of claim 15 wherein the synthetic fibers are formed with a multidirectional fiber needling.

17. A ground-cover apparatus for clearing the area around a ground-anchored structure, comprising:
   a) a mat having a generally planar, flexible configuration including a main body portion defined by an outer perimeter;
   b) said mat being formed of a substantially fibrous material that is uniformly porous so as to block the passage of sunlight while being pervious to air and water, and is treated with an ultraviolet inhibitor and a flame retardant;
   c) a central area of the mat being removable to permit installation of said mat around said ground anchored structure;
   d) a pattern of concentric profiles inscribed within the perimeter of said main body and indicative of said removable central area;
   e) whereby said mat, when installed, discourages the presence of animals in the immediate area, prevents the growth of vegetation around the structure, is substantially non-biodegradable, drains and dries.

18. The ground cover apparatus of claim 17 wherein the inscribed indicia is corresponding to particular ground-anchored structure for which the ground-covering mat surrounds.

19. The ground cover apparatus of claim 17 wherein the main body portion is pliable so as to conform to any ground surface on which it may be placed.

20. The ground cover apparatus of claim 17 and further including a plurality of stake openings in said mat adjacent said perimeter, wherein a stake is extendable through each stake opening so as to anchor the ground covering mat to the ground.

21. The ground cover apparatus of claim 17 wherein said concentric profiles are arranged off center of the mat so as to form an enlarged access or work area.

22. The ground cover apparatus of claim 17 wherein said main body is circular.

23. The ground cover apparatus of claim 22 wherein the concentric profiles are circular so as to form a circular central area corresponding with the ground-anchored structure.

24. The ground cover apparatus of claim 17 wherein the main body is rectangular.

25. The ground cover apparatus of claim 24 wherein the concentric profiles are rectangular so as to form a rectangular central area corresponding with the ground-anchored structure.

26. The ground cover apparatus of claim 17 further including additional inscribed directional indicia located on the upper surface of said main body portion.

27. The ground cover apparatus of claim 26 wherein the inscribed indicia is located between the outer perimeter and outermost inscribed profile.

28. The ground cover apparatus of claim 26 wherein said inscribed indicia is formed from a fast dry gloss vinyl ink.

29. The ground cover apparatus of claim 17 wherein the main body is constructed with synthetic fibers.

30. The ground cover apparatus of claim 29 wherein the synthetic fibers are combined with a resin containing said ultraviolet inhibitor.

31. The ground cover apparatus of claim 30 wherein the synthetic fibers and combined resin is pressed to form the main body.

32. The ground cover apparatus of claim 31 wherein the synthetic fibers are formed with a multidirectional fiber needling.

33. A ground-cover apparatus for clearing the area around a ground-anchored structure, comprising:
   a) a mat having a generally planar, flexible configuration including a main body portion defined by an outer perimeter;
   b) said mat being formed of a substantially fibrous material that is uniformly porous so as to block the passage of sunlight while being pervious to air and water, and is treated with an ultraviolet inhibitor and a flame retardant;
   c) a central opening in said main body portion, said opening being slightly larger than the corresponding cross-sectional area of said ground-anchored structure;
   d) whereby said mat, when installed, discourages the presence of animals in the immediate area, prevents the growth of vegetation around the structure, is substantially non-biodegradable, drains and dries.

34. The ground cover apparatus of claim 33 further including an inscribed indicia located on a top surface of the main body of the ground-covering mat.

35. The ground cover apparatus of claim 33 further including a plurality of stake openings in said mat adjacent said perimeter, wherein a stake is extendable through each stake opening so as to anchor the ground covering mat to the ground.

36. The ground cover apparatus of any of claims 5, 22 and 35 wherein each stake includes an elongated member with a top hook and a bottom barb, wherein the top hook is positionable through a stake opening with the elongated member positioned beyond the outer perimeter and the bottom barb is insertable into the ground.

37. A method for clearing the area around a ground-anchored structure having a base extending upwardly from ground, comprising the steps of:
   a) covering the area surrounding said base with a mat so configured as to generally encircle and surround with the circumference of the base.
   b) treating the mat with ultraviolet inhibitors and flame retardants;
   c) constructing the mat of fibers and uniformly porous so as to prevent passage of sunlight to the area therebeneath, yet permit the passage of air and water;
   d) extending the ground-covering mat outwardly from the base in all directions a distance of at least twelve inches.

38. The method of claim 37 further including the step of anchoring the mat to the ground by connecting stakes through the mat into the ground around the perimeter of the mat.

* * * * *